United States Patent
Sammeta et al.

(10) Patent No.: US 9,774,362 B1
(45) Date of Patent: Sep. 26, 2017

(54) ADAPTIVE ANTENNA TUNING BASED ON A SENSED CHARACTERISTIC

(71) Applicant: Amazon Technologies, Inc., Seattle, WA (US)

(72) Inventors: Rohit Sammeta, Mountain View, CA (US); Anuj Dron, San Jose, CA (US); Peruvemba Ranganathan Sai Ananthanarayanan, Sunnyvale, CA (US); Chun Kit Lai, Cupertino, CA (US); Eswarappa Channabasappa, Sunnyvale, CA (US); Namhoon Kim, San Jose, CA (US); Dave Kim, Sunnyvale, CA (US); Adrian Napoles, Cupertino, CA (US); Ulf Jan-Ove Mattsson, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/536,160

(22) Filed: Nov. 7, 2014

(51) Int. Cl.
*H04B 1/04* (2006.01)
*H04B 1/40* (2015.01)
*H04W 52/28* (2009.01)

(52) U.S. Cl.
CPC .............. *H04B 1/40* (2013.01); *H04B 1/0458* (2013.01); *H04M 2250/12* (2013.01); *H04W 52/288* (2013.01)

(58) Field of Classification Search
None
See application file for complete search history.

(56) References Cited

U.S. PATENT DOCUMENTS

| | | | |
|---|---|---|---|
| 2008/0090539 A1* | 4/2008 | Thompson | H03F 1/02 455/250.1 |
| 2011/0105023 A1* | 5/2011 | Scheer | H01Q 1/242 455/41.2 |
| 2013/0217342 A1* | 8/2013 | Abdul-Gaffoor | H01Q 1/243 455/77 |
| 2015/0044977 A1* | 2/2015 | Ramasamy | H04B 7/0404 455/77 |
| 2015/0237183 A1* | 8/2015 | Novet | H04M 1/72569 455/556.1 |

* cited by examiner

*Primary Examiner* — Alejandro Rivero
(74) *Attorney, Agent, or Firm* — Lowenstein Sandler LLP

(57) ABSTRACT

A user device obtains sensor data from sensors included in the user device. A set of current state information is determined based on the sensor data. A tuner code associated with the current state information is identified. Tuning values associated with the tuner code are varied during a training stage to determine an optimized tuner code. One or more antennae of the user device are tuned for communication in accordance with the optimized tuner code.

12 Claims, 13 Drawing Sheets

| USE MODE STATE | STATE INFORMATION | | | | | | | |
|---|---|---|---|---|---|---|---|---|
| | FREQUENCY STATE | IMAGER STATE | CAPACITIVE SENSOR STATE | ACCELEROMETER STATE | TIME | PRESSURE STATE | TEMPERATURE | TUNER CODE |
| HEAD + HAND | 825 | EAR DETECT | HAND DETECT | RIGHT | 9:00 AM | 1 ATM | 25° | A2 |
| HAND RIGHT | 825 | FACE DETECT | HAND DETECT | RIGHT | 9:30 AM | 1 ATM | 30° | BF |
| HAND LEFT | 825 | FACE DETECT | HAND DETECT | LEFT | 10:00 AM | 1 ATM | 30° | A9 |
| LANDSCAPE | 1900 | FACE DETECT | CASE DETECT | LANDSCAPE | 9:00 PM | 1 ATM | 28° | B7 |
| LANDSCAPE | 1900 | USER A | HAND DETECT | LANDSCAPE | 9:30 PM | 1 ATM | 30° | BC |

Figure 7

ADAPTIVE ANTENNA TUNING BASED ON A SENSED CHARACTERISTIC

BACKGROUND

Conventional devices that have one or more antennae (e.g., mobile phones) include an antenna tuner operatively coupled between a transmitter or receiver and the one or more antennae to improve power transfer between them by matching an impedance of the transmitter/receiver to a load impedance. The antenna tuner operates according to static tuning settings and codes that are pre-populated and established as factory settings, prior to the sale and use of the device. As such, the tuner codes established as factory settings of the device remain unchanged throughout the life and use of the device.

However, parameters affecting antenna tuning may vary and change based on the actual use of the device. In particular, the individual characteristics, behavioral characteristics and environmental characteristics that affect the device when in use are not accounted for in establishing the antenna tuner codes.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

FIG. 7 is an illustration of an exemplary antenna tuner code table, according to embodiments of the present disclosure

DETAILED DESCRIPTION

Methods and systems for enabling a user device to optimize antenna tune codes associated with one or more antennae used to wirelessly transmit data are described. The user device may be any content rendering device that includes a wireless modem for connecting the user device to a network. Examples of such user devices include electronic book readers, cellular telephones, personal digital assistants (PDAs), portable media players, tablet computers, netbooks, and the like.

In one embodiment, a user device obtains sensor data from one or more sensors included in the user device. The sensor data relates to individual characteristics of a user of the user device, behavioral characteristics of the user of the user device, and an environment associated with the user device. The identified and learned individual, behavioral, and environmental characteristics create a profile that is unique to a user and user device. The user device performs a state identification process to determine a current state of the user device based on the sensor data. The state identification process may be conducted as a background process during normal operation of the user device on a periodic basis (e.g., according to a schedule, randomly, etc.) or may be triggered in view of another activity (e.g., a network event, a powering on of the device, etc.).

In an embodiment, during a training stage, an optimized tuner code is determined based on measurements of one or more tuning parameters of the device for each of multiple candidate tuner codes. A tuner code lookup table may be maintained that provides an association with user device states and a corresponding tuner code. The tuner code associated with each state may be preset in the table during a factory setting stage. In an embodiment, as a result of the training stage, an optimized tuner code may be identified for a particular state. The tuner code lookup table may be updated to reflect the association between a particular state and the optimized tuner code. Furthermore, the one or more antennae of the user device may be tuned for communication (e.g., transmission and/or reception) in accordance with the optimized tuner code.

Figure 1:
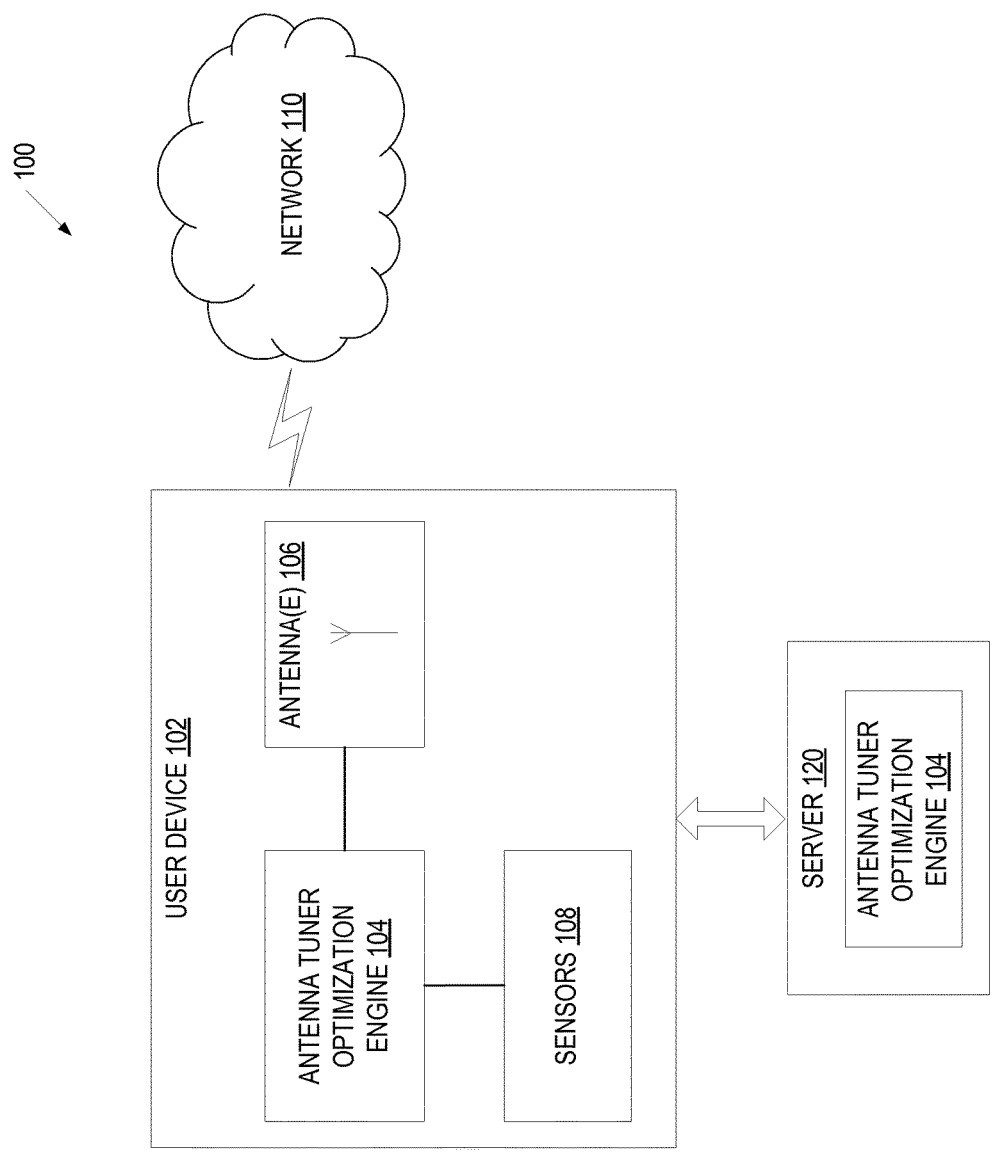
FIG. 1 is a block diagram of an exemplary network architecture, according to embodiments of the present disclosure.

FIG. 1 is a block diagram of an exemplary network architecture 100 in which embodiments described herein may operate. The network architecture 100 may include one or more user devices 102 capable of communicating via a network 110 (e.g., public network such as the Internet or private network such as a local area network (LAN)).

The user device 102 is variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user device 102 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The user device 102 includes one or more antennae 106 configured to transmit and receive communication messages via the network 110.

Communications transmitted and received by the user device 102 may be enabled via any communication infrastructure. One example of such an infrastructure includes a combination of a wide area network (WAN) and wireless infrastructure, which allows a user to use the user device 102 to purchase items and consume items without being tethered to another system via hardwired links. The wireless infrastructure may be provided by one or multiple wireless communications systems. The one or more wireless communication systems may be a wireless fidelity (WiFi) hotspot connected with the network 110. In an embodiment, the network 110 may be connected to a wireless carrier system that can be implemented using various data processing equipment, communication towers, etc. Alternatively, or in addition, the wireless carrier system may rely on satellite technology to exchange information with the user device 102 via communications propagated by one or more antennae.

In an embodiment, the user device 102 includes one or more sensors 108 configured to collect sensor data associated with a user of the user device 102 (i.e., individual data), behavioral data associated with a user of the user device 102 (i.e., behavioral data), and environmental data associated with the user device 102 (i.e., environmental data) In an embodiment, the individual data may include data associated with an individual user's characteristics, such as, for example, a user's body properties, a size of a user's hands, dielectric parameters associated with the user (e.g., a loss tangent associated with the user), etc. In an embodiment, the behavioral data may include data associated with a user's behavior as it relates to usage of the user device 102, such as, for example, a current hand grip employed by the user (e.g., an identification of a current right-handed or left-handed grip on the user device), a tilt position or angle of the user's head, a tendency of the user to grip the user device in a right-handed manner or a left-handed manner (i.e., the user's "grip tendency"), etc. In an embodiment, the environmental data may include data associated with the environment of the user device 102, such as, for example, use of the user device with one or more accessories (e.g., a case, payment accessories, headphones, etc.), an ambient temperature of the environment of the user device, an operating temperature of the user device, an identification of one or more cell towers previously accessed by the user device 102, one or more Wifi channels used by the user device 102, etc. The state information including the identified individual, behavioral, and environmental characteristics create a unique profile associated with the user and user device. The unique profile may be updated and refined over time via one or more training stages to produce improved and optimized tuner codes for use in tuning one or more antennae of the user device.

According to embodiments of the present disclosure, any suitable sensor 108 may be used to collect the sensor data. Exemplary sensors 108 suitable for use in accordance with the present disclosure include, but are not limited to, image sensors (e.g., one or more cameras), accelerometers, time-related sensors, temperature sensors, pressure sensors, capacitive sensors, location sensors, frequency sensors, gyroscopes, grip sensors, network sensors, proximity sensors, etc. In an example, a camera of the user device may be employed to detect and collect data for determining a position of a hand and grip type being used to hold the user device.

Embodiments of the disclosure overcome the above shortcomings by using static factory-set antenna tuner codes that operate independently of the individual, behavioral, and environmental characteristics associated with a user device. According to embodiments, an antenna tuner optimization engine 104 is provided. The antenna tuner optimization engine 104 is configured to receive the sensor data from sensors 108, determine current state information associated with the user device 102 based on the sensor data, and determine an optimized antenna tuner code for the current state information. The current state information associated with the user device may be comprised of multiple state values associated with one or more individual, behavioral, and environmental characteristics associated with a user device. Exemplary state values that may be used to define the current state information of a user device may include, but are not limited to, a Beside Head and Hand Right Side (BHHR) value, a Beside Head and Hand Left Side (BHHL) value, a right-handed landscape or portrait orientation, a left-handed landscape or portrait orientation, a torso position (with the display oriented in or out), a chest position (with the display oriented in or out), an in vehicle position, a dash mount position, an on-a-surface position, having one or more accessories associated with the user device (e.g., a protective cover, external accessories plugged in, etc.).

In one embodiment, the user device 104 includes an antenna tuner optimization engine 104 that receives sensor data from the one or more sensors 108 and performs an optimization of the antenna tuner to control one or more antennae 106 in communicating via network 110. In one embodiment, the antenna tuner optimization engine 104 uses the sensor data to determine the current state information, and further determines whether to optimize or adjust a tuner code to optimize the tuner code in view of the individual characteristics, behavioral characteristics, and environmental characteristics reflected by the current state information. As shown in FIG. 1, the antenna tuner optimization engine 104 may be included on the user device 102 or may be remotely hosted on a server 120 operatively coupled to the user device 102.

Figure 2:
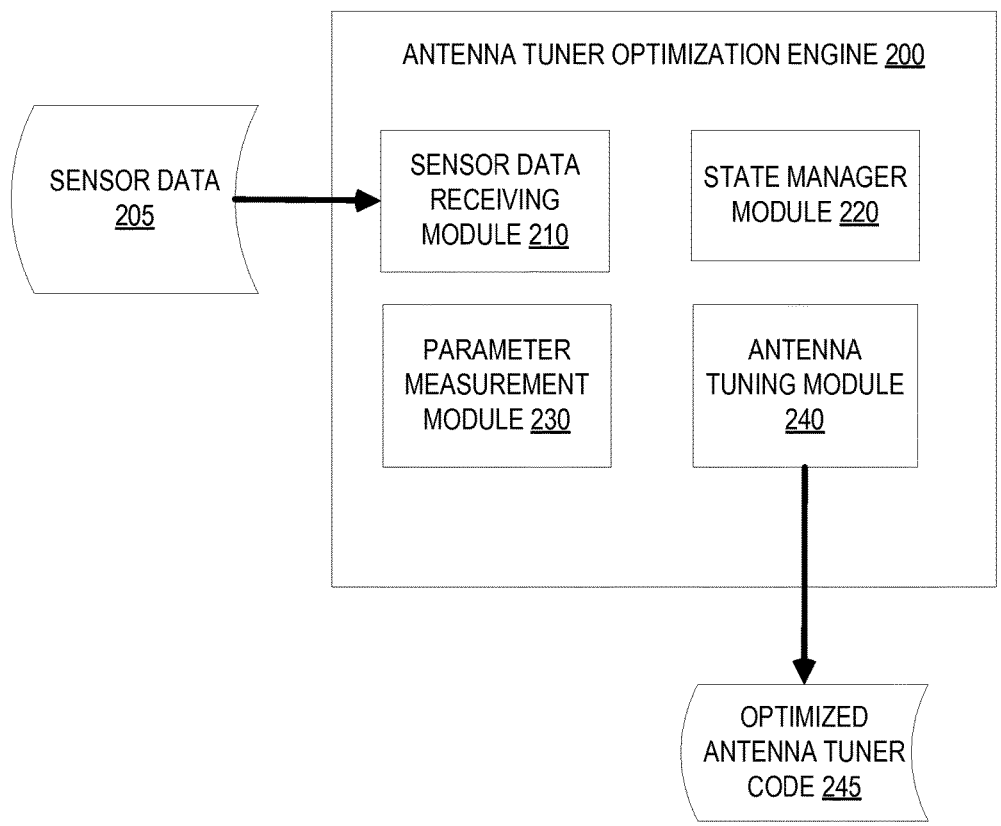
FIG. 2 is a block diagram of one embodiment of an antenna tuner optimization engine, according to embodiments of the present disclosure.

FIG. 2 is a block diagram of one embodiment of an antenna tuner optimization engine 200, which may correspond to the antenna tuner optimization engine 104 of FIG. 1. In one embodiment, the antenna tuner optimization engine 200 includes a sensor data receiving module 210, a state manager module 220, a parameter measurement module 230, and an antenna tuning module 240. The sensor data receiving module 210 receives sensor data 205 from one or more sensors associated with a user device. As described above, the sensor data 205 may include any information capable of collection by one or more sensors of the user device. In an implementation, the sensor data receiving module 210 is configured to collect one or more elements of the sensor data 205 upon the occurrence of a state identification process. In an implementation, the sensor data receiving module 210 may be configured to periodically receive and collect sensor data 205 and store the collected sensor data 205 for provisioning to the state manager module 220 upon the occurrence of a state identification process. As described above, the state identification process may be conducted as a background process during normal operation of the user device on a period basis (e.g., according to a schedule, randomly, etc.) or may be triggered in view of another activity (e.g., a network event, a powering on of the device, etc.). In embodiments of the present disclosure, the state identification process may be initiated by any of the modules of the antenna tuner optimization engine 200.

According to embodiments of the present disclosure, the sensor data receiving module 210 is configured to provide the collected sensor data 205 to the state manager module 220. The state manager module 220 uses the collected sensor data 205 to determine current state information associated with the user device. The current state information may include one or more state values associated with the individual, behavioral, and environmental characteristics associated with the user, the user device, and the user device's environment. The current state information may be defined by a combination of state values, such as for example, a combination of a user mode value (e.g., hand plus head use, right-handed use, left-handed use, etc.), a frequency of the user device (e.g., 825 MHz, 1900 MHz, etc.), an image sensor state (e.g., ear detection, face detection, user identification detection, etc.), a capacitive sensor (e.g., hand detection, case detection, etc.), an accelerometer state value (e.g., landscape orientation, portrait orientation, right-handed grip, left-handed grip, etc.), a time, a pressure state value (e.g., 1 Atm), a temperature (e.g., 25° C., 30° C., etc.), etc.

Based on the determined current state information, a current tuner code is identified by the parameter measurement module 230. The current tuner code may be determined by performing a search of a tuner code lookup table configured to associated tuner codes with various states of the user device. In an embodiment, the tuner code lookup table may initially be loaded with tuner codes during a factory-setting process. In an embodiment, for each state of the user device, a factory-set initial tuner code is provided in the lookup table.

During a training phase for the determined state information, the parameter measurement module 230 measures one or more tuning parameters at a current tuner code. According to embodiments of the present disclosure, the tuning parameters may include any parameter associated with antenna tuning calibration or setting, such as, for example, a received signal strength indication (RSSI) parameter, a transmission level parameter, a reception level parameter, a return loss parameter, an antenna input impedance parameter, etc.

In an implementation, the parameter measurement module 230 may determine whether a training scenario is detected for the current state information (i.e., whether to enter the training phase). According to implementations, a training scenario may be detected upon the occurrence of a factory reset, the configuration/set-up of a new user device, at a period time interval (e.g., a daily interval since the most recent training stage, a weekly interval since the most recent training stage, etc.), a determination of the lack of sufficient samples, when operating in a strong signal environment, etc.).

In an implementation, the antenna tuning module 240 is configured to receive the measured tuning parameters associated with the current tuner code from the parameter measurement module 230. During the training phase, the antenna tuning module 240 performs an optimization of the current tuner code. In an implementation, the optimization includes varying the values of one or more tuning values associated with the current tuner code (e.g., a register value of the tuner code that has an impact or causes a change to an inductance value or capacitance value of the antenna tuner). In implementations, the antenna tuning module 240 may vary one or more of the current tuning values in a random manner or in accordance with a suitable machine learning algorithm or optimization algorithm (e.g., a Genetic Algorithm, a Particle Swarm Optimization, etc.) that are readily applicable.

In an implementation, the antenna tuning module 240 may iteratively perform the varying of the tuning values, such that the parameter measurement module 230 may perform further measurements of the tuning values until the training stage is complete. Upon completion of the training stage, the antenna tuning parameters of the optimized antenna tuner code 245 are identified and stored in the tuner code table in association with the current state information.

According to implementations of the present disclosure, the sensor data 205, determined state information, measured tuning parameters, varied tuning values, and optimized antenna tuner codes may be stored in volatile or nonvolatile memory of the user device 104.

Figure 3:
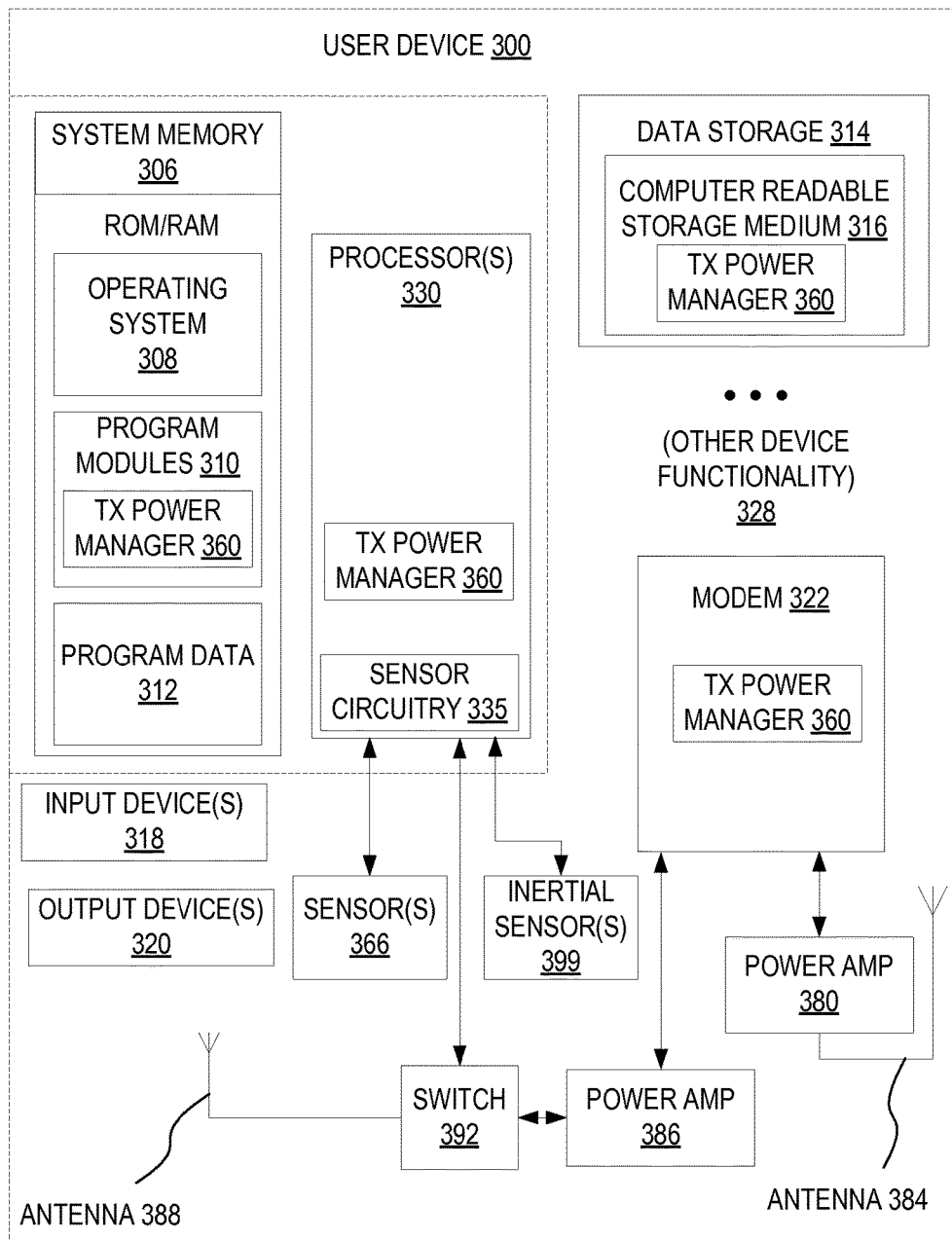
FIG. 3 is a block diagram illustrating an exemplary user device, according to embodiments of the present disclosure.

FIG. 3 is a block diagram illustrating an exemplary user device 300. The user device 300 may correspond to the user device 104 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like.

The user device 300 includes a processing device 330 that represents one or more general-purpose processing devices such as a microprocessor, central processing unit, or the like. More particularly, the processing device 330 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 330 may also be one or more special-purpose processing devices such as an application specific integrated circuit (ASIC), a field programmable gate array (FPGA), a digital signal processor (DSP), network processor, or the like.

The user device 300 also includes system memory 306, which may correspond to any combination of volatile and/or non-volatile storage mechanisms. The system memory 306 stores information which provides an operating system component 308, various program modules 310 such as transmit (TX) power manager 360, program data 312, and/or other components. The user device 300 performs functions by using the processor(s) 330 to execute instructions provided by the system memory 306.

The user device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the transmit power manager 360 may reside, completely or at least partially, within the computer readable storage medium 316, system memory 306 and/or within the processor(s) 330 during execution thereof by the user device 300, the system memory 306 and the processor(s) 330 also constituting computer-readable media. The user device 300 may also include one or more input devices 318 (keyboard, mouse device, specialized selection keys, etc.) and one or more output devices 320 (displays, printers, audio output mechanisms, etc.).

The user device 300 further includes a wireless modem 322 to allow the user device 300 to communicate via a wireless network (e.g., such as provided by the wireless communication system) or cloud network environment (e.g., one or more cloud servers) with other computing devices, such as remote computers, the item providing system, and so forth. The wireless modem 322 allows the user device 300 to handle both voice and non-voice communications (such as communications for text messages, multimedia messages, media downloads, web browsing, etc.) with the wireless communication system. The wireless modem 322 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed down-link packet access (HSDPA), WiFi, etc. In one embodiment, the wireless modem includes the transmit power manager 360 in addition to, or instead of, the transmit power manager 360 being included in the computer readable storage medium 316, system memory 306 and/or processor(s) 330. The transmit power manager 360 may be implemented as hardware, firmware and/or software of the wireless modem 322.

The wireless modem 322 may generate signals and send these signals to power amplifier 380 or power amplifier 386 for amplification, after which they are wirelessly transmitted via antenna 384 or antenna 388, respectively. Antenna 384 and 388 may be configured to transmit in different frequency bands and/or using different wireless communication protocols. The antennas 384, 388 may be directional, omnidirectional or non-directional antennas. In addition to sending data, antennas 384, 388 also receive data, which is sent to wireless modem 322 and transferred to processor(s) 330.

Though a single modem 322 is shown to control transmission to both antennas 384 and 388, the user device 300 may alternatively include multiple wireless modems, each of which is configured to transmit data via a different antenna and/or wireless transmission protocol. In one embodiment, each modem includes an independent transmit power manager. Alternatively, a single transmit power manager (e.g., that is included in system memory 306, processor 330 and/or data storage 314) may control transmit power levels used by each wireless modem. In addition, the user device 300, while illustrated with two antennas 384, 388, may include more or fewer antennas in various embodiments.

In one embodiment, user device 300 includes one or more sensors 366 (e.g., sensors 108 of FIG. 1). The sensors 366 can detect the presence of human body parts, and convey sensor data (e.g., sensor data 205 of FIG. 2) regarding the detected presence to processor(s) 330. In one embodiment, the sensors 366 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 366 may also be optical (e.g., infrared) sensors that use an emitter and receiver pair to detect the presence of opaque objects. Alternatively, the sensors 366 may be inductive sensors, which include an inductive loop. When the presence of a human body part (or metal object) is brought close to the inductive sensor, an induction of the inductive loop changes, causing the human body part to be detected. Alternatively, the sensors 366 may be ultrasonic sensors that emit an ultrasonic signal and measure a time duration between when a signal is transmitted and the reflection of that signal received (a.k.a., flight response). The sensors 366 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, user device 300 includes one or more inertial sensors 399. The inertial sensors 399 can be used to detect motion of the user device 300. In one embodiment, the inertial sensors 399 detect linear accelerations (translational movement) and angular accelerations (rotational movement). The inertial sensors 399 may include accelerometers and/or gyroscopes. Gyroscopes use principles of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The inertial sensors 399 in one embodiment are micro-electromechanical systems (MEMS) sensors.

The processor(s) 330 may include sensor circuitry 335 (e.g., sensor device drivers) that enables the processor(s) 330 to interpret signals received from the sensor(s) 366 and/or inertial sensors 399. In one embodiment, the sensors 366 and/or inertial sensors 399 output fully processed signals to the processor(s) 330. For example, the sensors 366 may output a distance, a detected/not detected signal, etc. using a single line interface or a multi-line interface. Similarly, inertial sensors 399 may output an acceleration value (e.g., in Gs). In another embodiment, the sensors 366 output, for example, positional data and/or object presence data (e.g., of a human body part) to the processors 330 without first processing the data. Similarly, inertial sensors 399 may output, for example, voltage values that can be interpreted as acceleration values. In either instance, the processors 330 may use the sensor circuitry 335 to process and/or interpret the received data. If data is received from multiple sensors 366 and/or inertial sensors 399, processing the data may include averaging the data, identifying a maximum from the data, or otherwise combining the data from the multiple sensors. In one embodiment, in which the sensors 366 include a sensor array, numerous sensors, or a touch panel, processing the data includes determining where on the user device the human body part is located from multiple sensor readings.

In one embodiment, antenna 388 is used as a proximity sensor (e.g., as a sensor electrode for a proximity sensor). To enable the use of antenna 388 as a proximity sensor, a switch 392 disconnects the antenna 388 from power amp 386 (and thus from modem 322), and connects antenna 388 to sensor circuitry 335 and/or to a proximity sensor integrated circuit (not shown) that connects to sensor circuitry 335. While there is an electrical connection between sensor circuitry 335 and antenna 388, the antenna 388 provides signals to sensor circuitry 335. The sensor circuitry 335 processes the signals to determine whether the presence of a human body part is detected. While there is an electrical connection between antenna 388 and power amp 386, antenna 388 may be used to transmit and receive information (e.g., to maintain a wireless connection). In one embodiment, by default the switch 392 maintains an electrical connection between power amp 386 and antenna 388.

In one embodiment, processor 330 controls whether the switch 392 provides an electrical connection between the sensor circuitry 335 and the antenna 388 or between the power amp 386 and the antenna 388. Alternatively, or in addition, modem 322 may control switch 392. Switch 392 may provide an electrical connection between sensor circuitry 335 and antenna 388 on a periodic or other basis (e.g., every 500 ms or ever 1 s). The electrical connection between the sensor circuitry 335 and the antenna 388 may then be sustained for a predetermined time period (e.g., 100 ms), after which the electrical connection between the antenna 388 and sensor circuitry 335 is terminated, and an electrical connection between the power amp 386 and the antenna 388 is established. In one embodiment, the user device determines when antenna 388 will not be sending or receiving data, at which point switch 392 establishes an electrical connection between antenna 388 and sensor circuitry 335.

Note that an additional switch (not shown) may be interposed between power amp 380 and antenna 384, which may function in the manner described above with reference to switch 392. The additional switch may have connections to sensor circuitry 335 and processor 330 as shown for switch 392.

Figure 4A:
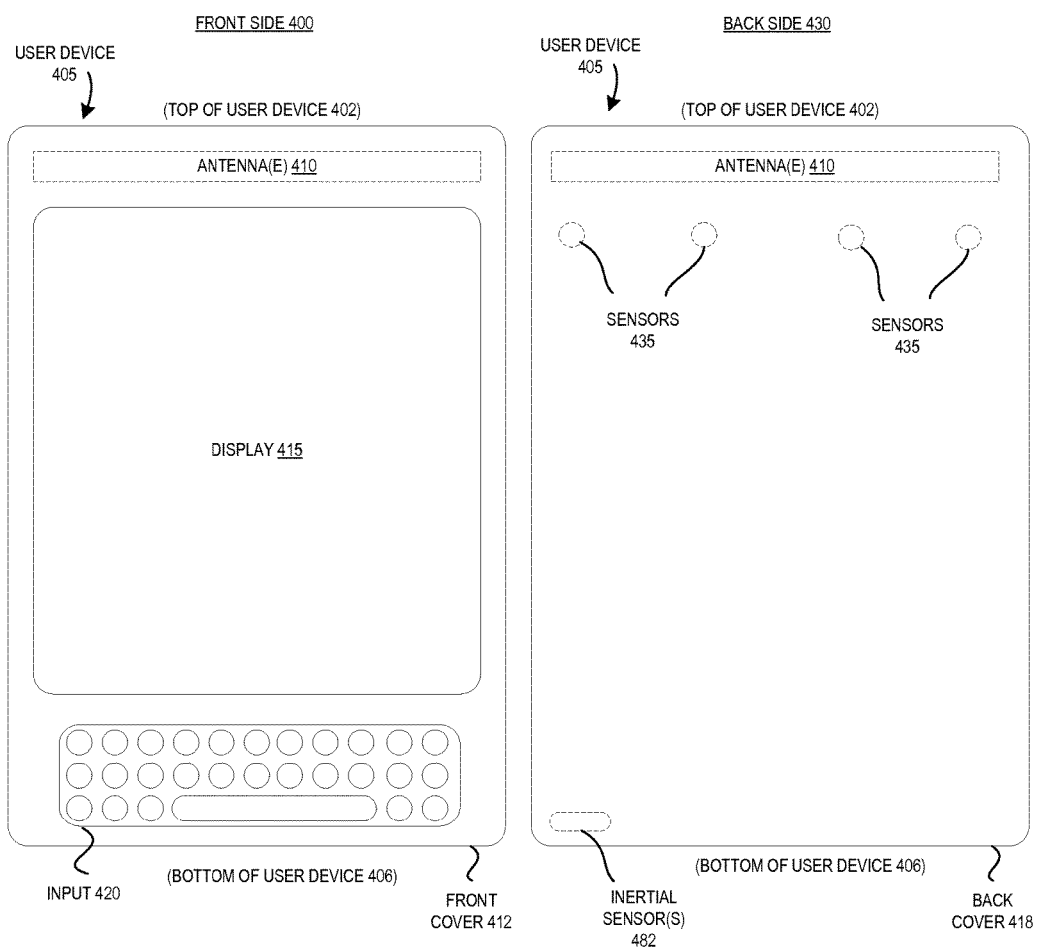
FIG. 4A illustrates an example of a front side and back side of a user device, according to embodiments of the present disclosure.

FIGS. 4A-4F illustrate various embodiments of a user device 405. Referring to FIG. 4A, a front side 400 and back side 430 of user device 405 are shown. The front side 400 includes a display 415 and optionally an input 420 housed in a front cover 412. The display 415 may use any available display technology, such as electronic ink (e-ink), liquid crystal display (LCD), transflective LCD, light emitting diodes (LED), laser phosphor displays (LSP), and so forth. The input 420 may include a keyboard, touch pad, or other input mechanism. In one embodiment, the display 415 and input 420 are combined into one or more touch screens.

Disposed inside the user device 405 is one or more antennae 410, one or more sensors 435 and one or more inertial sensors 482. Note that in some embodiments the user device 405 may not include sensors 435, and in other embodiments the user device 405 may not include inertial sensors 482. As shown, the one or more antennae 410 is positioned near a top 402 of the user device 405. However, the one or more antennae 410 may also be positioned at other locations, such as at a side of the user device 405 or near the bottom 406 of the user device 405.

Disposed at a back side of the user device 405 are one or more sensors 435. The sensors 435 may be proximity sensors such as inductive sensors, capacitive sensors, magnetic sensors, infrared sensors, ultrasonic sensors, or the like. The sensors 435 may also be touch sensors such as a resistive touch sensor, a capacitive touch sensor, a mechanical touch sensor (e.g., a mechanical button), or the like.

The one or more inertial sensors may have fixed positions within the user device 405. The inertial sensors 482 may include gyroscope and/or accelerometer (e.g., a 3 axis accelerometer). The gyroscope and accelerometer may be separate sensors, or may be combined into a single sensor.

The one or more antennae 410, sensors 435 and inertial sensors 482 are shown in the illustrated embodiment using dashed lines to indicate that these components are not on a surface of the user device 402 (e.g., that they are inside a back cover 418). However, in alternative embodiments these components may be on a surface of the user device 405.

Note that in one embodiment the sensors 435 are disposed proximate to the antenna 410 to detect when a human body part is close to the one or more antennae 410. This may include detecting a distance between the one or more antennae 410 and the human body part. The sensors 435 may be disposed in an approximately linear pattern as shown in FIG. 4A. Alternatively, the sensors 435 may be disposed in other patterns at the back side of the user device 405. Such additional patterns may include a square pattern as shown in FIG. 4D, an elliptical pattern, a checkerboard pattern, or other pattern. The sensors 435 may be discrete sensors (as shown), or may be linear sensor arrays, other sensor arrays, a touch panel, slider sensors, or the like. The sensors 435 may also be a single proximity. For example, a single proximity sensor may be included that is substantially equal to the size of the entire back 418 of the user device 405. As shown, the sensors 435 are disposed between the antenna 410 and the bottom 406 of the user device 405. However, one or more sensors 435 may also be disposed at other locations with relation to the one or more antennae 410, such as between the one or more antennae 410 and the top 402 of the user device 405. Though sensors 435 are shown only at the back side 430 of the user device 405, the front side 400 of the user device 405 may also include other sensors. In one embodiment, as described above with reference to FIG. 3, the one or more antennae 410 itself acts as a proximity sensor. In such an embodiment, some or all of sensors 435 may be omitted.

Figure 4B:
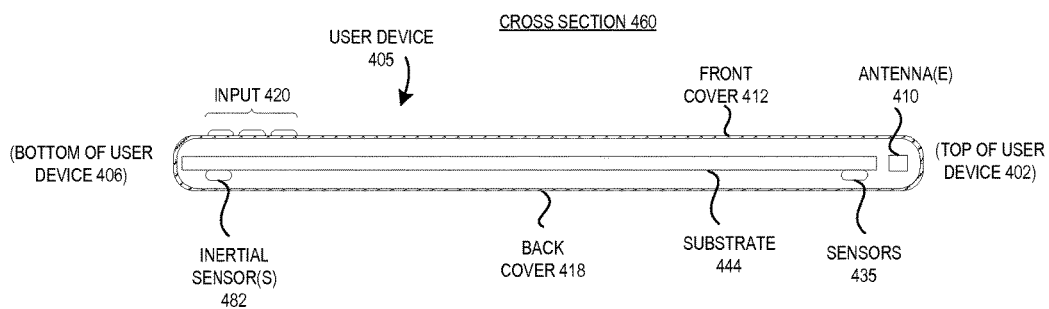
FIG. 4B illustrates a cross-sectional side view of the user device, according to embodiments of the present disclosure.
Figure 4C:
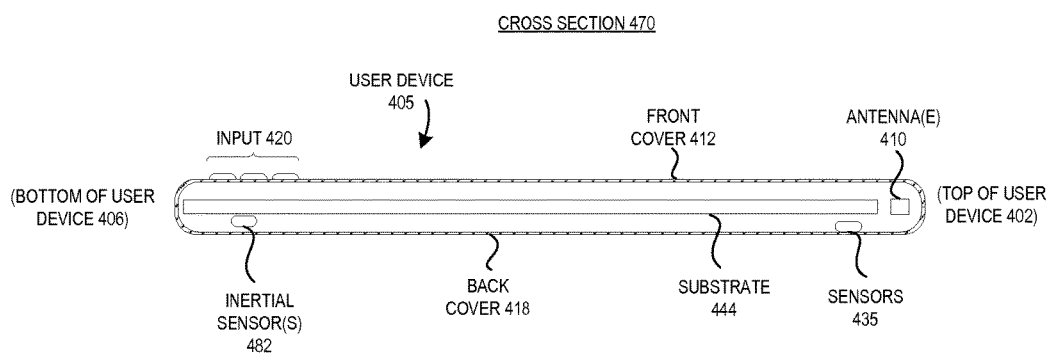
FIG. 4C illustrates a cross-sectional side view of the user device, according to embodiments of the present disclosure.
Figure 4D:
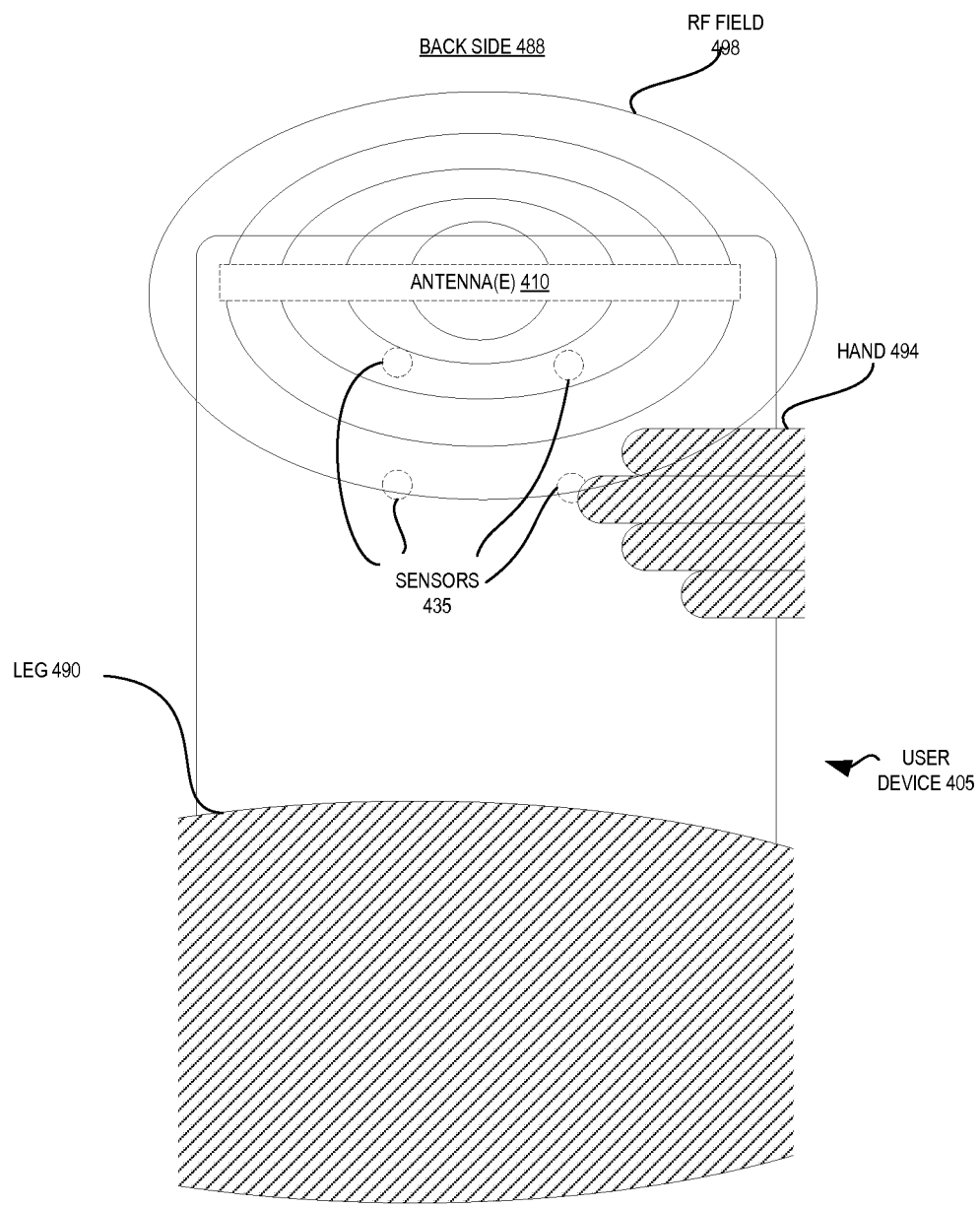
FIG. 4D illustrates a back side of a user device in contact with portions of a human body, according to embodiments of the present disclosure.

FIGS. 4B and 4C illustrate cross-sectional side views 460 and 470 of the user device 405, in accordance with two embodiments of the present invention. Both cross-sectional side views 460, 470 show the one or more antennae 410, sensors 435 and inertial sensors 482 housed within the front cover 412 and back cover 418 of the user device 405. However, cross-sectional side view 460 shows the sensors 435 being attached to an underside of a non-conductive substrate 444, which may be a rigid substrate (e.g., a printed circuit board (PCB)) or a flexible substrate (e.g., a polyimide film, polyester film, or polyether ether ketone (PEEK) film), while cross-sectional side view 470 shows the sensors 435 being attached to an inside of the back cover 418. In other embodiments, the sensors 435 may alternatively be positioned within the back cover 418 such that they are flush with the outer perimeter of the back cover 418, protrude outside of the back cover 418 or recede within the back cover 418. Some sensors 435 may also be attached to a front of the non-conductive substrate 444 (e.g., a PCB) or to an inside of the front cover 412. Inertial sensors 482 may be attached to an inside of the front cover 412 or back cover 418, attached to a top side or bottom side of the non-conductive substrate 444, or attached to some other component of the user device 405. Additionally, inertial sensors 482 may be positioned at a top, bottom, middle, side, or other location on the user device 405.

FIG. 4D illustrates a back side 488 of a user device 405 that is in contact with portions of a human body. Specifically, a user's hand 494 and leg 490 are shown to be in contact with the back side 488 of the user device 405. During transmission of data, the one or more antennae 410 emit a radio frequency (RF) field that may be absorbed by the portions of the human body (e.g., by the hand 494 and/or leg 490). The amount of power/radiation that may be absorbed from the RF field 498 by the portions of the human body are based on a distance of the human body part from the one or more antennae 410. The power of the RF field 498 drops off at a rate of $1/d^2$, where d is distance from the antenna 410. Accordingly, the closer a human body part is to the one or more antennae 410, the more radiation that may be absorbed. In the example illustrated in FIG. 4D, the leg 490 would only absorb a nominal amount of radiation from the RF field 498 because of the distance between the one or more antennae 410 and the leg 490. However, the hand 494 may be close enough to the one or more antennae 410 to possibly absorb elevated amounts of radiation.

The hand 494 is positioned over one of sensors 435. Thus, the sensors 435 detect the presence of the hand 494. In some embodiments, depending on the sensor type, the sensors may detect the presence of a human body part even if the human body part is not in direct contact with the sensor 435 or not positioned directly over the sensor 435. For example, capacitive sensors, inductive sensors, optical sensors, ultrasonic sensors and the like may detect objects that are proximate to, but not touching, the sensors. If sensors 435 are positioned across the entire back side 488 (e.g., in a sensor array), then signals from multiple sensors can be processed to visualize a size, shape and/or position of a detected object. This may enable the user device 405 to identify whether a detected object is a human body part, as well as a distance between the human body part and the one or more antennae 410. If the one or more antennae 410 acts as a sensor, it may be sensitive enough to detect the proximity of hand 494 and/or leg 490.

Upon detection of the hand 494, the user device 405 may throttle an output power level used to transmit data via the one or more antennae 410, may restrict transmission of data entirely, may switch to a different antenna, adjust a parameter of an antenna, etc. Such throttling or restriction may remain in place until the hand 494 is no longer detected, at which time normal output power levels may be used for the transmission of data.

Figure 4E:
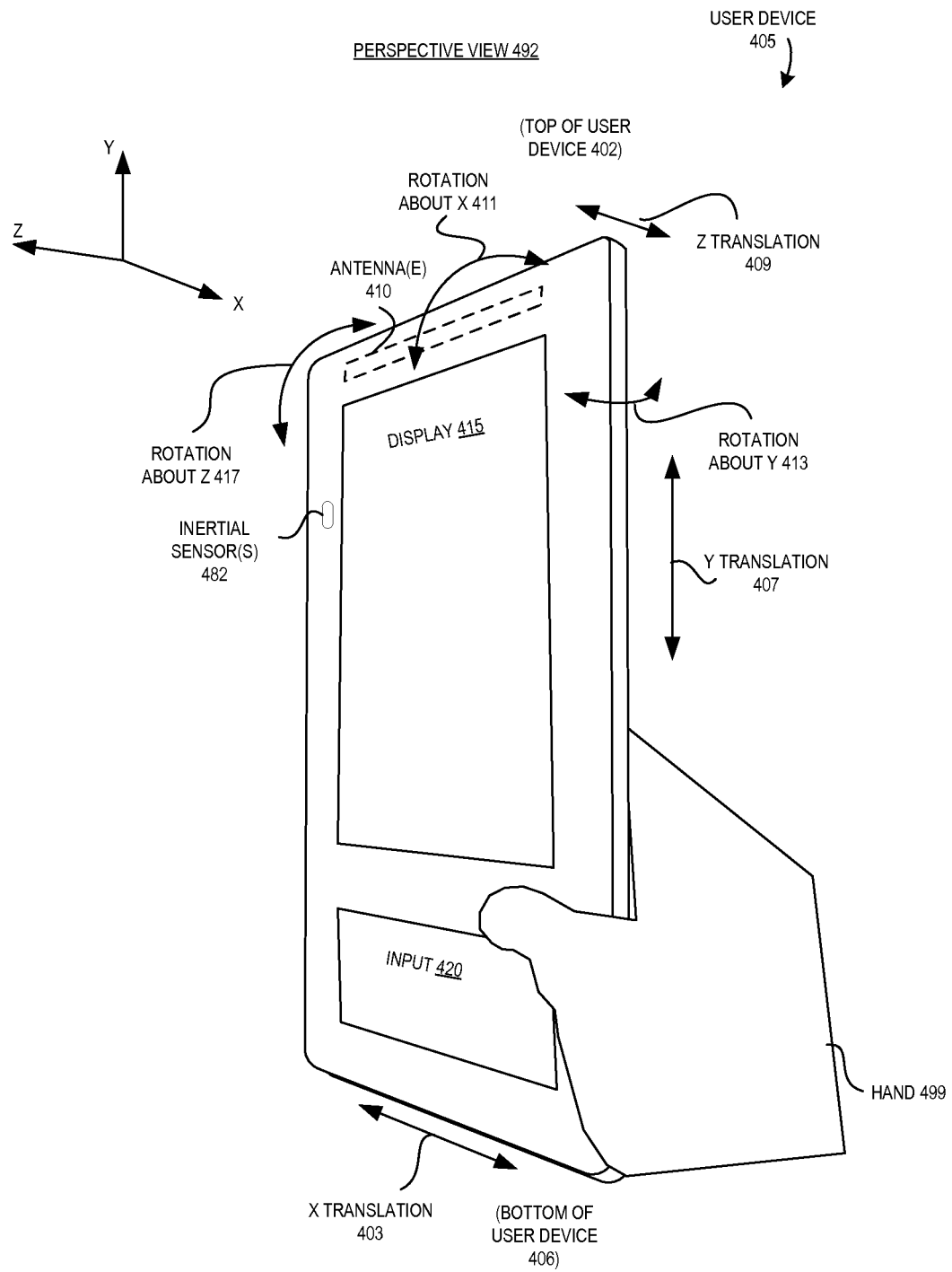
FIG. 4E illustrates a perspective view of a user device held in the hand of a user, according to embodiments of the present disclosure.

FIG. 4E illustrates a perspective view 492 of the user device 405 held in the hand 499 of a user. As the user holds the user device 405, the user's hand 499 is not perfectly still. For example, the user's hand 499 may shake or otherwise move linearly in one or more directions (e.g., in an X direction, Y direction and/or Z direction). This linear (translational) motion may be registered by the inertial sensors 482 as linear acceleration in the X direction 403, linear acceleration in the Y direction 407 and linear acceleration in the Z direction 409. The user's hand 499 may also exhibit angular motion (e.g., about the X-axis, about the Y-axis and/or about the Z-axis). This motion may be registered by the inertial sensors as a rotation (or angular acceleration) about the Y-axis 413 (changes in roll), rotation (or angular acceleration) about the X-axis 411 (changes in pitch) and rotation (or angular acceleration) about the Z-axis 417 (changes in yaw). These detected motions may be used by the user device 405 to detect the presence of the hand 499 (or other human body part).

In one embodiment, the inertial sensors 482 gather motion data over a sample period, and compare the motion data to human body part presence criteria. The human body part presence criteria may include linear acceleration thresholds and/or angular acceleration thresholds. If the human body part presence criteria are satisfied (e.g., linear accelerations are above a linear acceleration threshold and angular accelerations are above an angular acceleration threshold), the user device 405 may determine that the presence of a human body part is detected. Upon such a determination, a transmit power management condition may be satisfied, and the user device 405 may throttle an output power level used to transmit data via the one or more antennae 410, or may restrict transmission of data entirely. Such throttling or restriction may remain in place until the presence of the human body part is no longer detected, at which time normal output power levels may be used for the transmission of data.

In one embodiment, the user device 405 determines whether the presence of a human body part is detected (e.g., whether the user device is held in a hand or resting on a leg) based on a combination of data from sensors 435 and from inertial sensors 482. For example, capacitive sensors may falsely detect the presence of a human body part when the user device 405 is resting on a metal surface. However, while the user device 405 is resting on the metal surface, the inertial sensors 482 would not detect the presence of a human body part. Similarly, inertial sensor 482 may falsely detect the presence of a human body part when the user device is in a moving vehicle, such as a car, train, bus, airplane, boat, etc., due to motions of the vehicle. However, while the user device is resting in the moving vehicle, sensors 435 may indicate that no presence of a human body part is detected. Thus, accuracy of detecting the presence of a human body part may be increased by using both the sensors 435 and inertial sensors 482.

The linear accelerations and angular accelerations detected by the inertial sensors 482 may differ depending on where a user is holding the user device 405. For example, when the user's hand 499 is holding the user device 405 near a bottom of the user device 406, inertial sensors 482 may detect first angular accelerations and linear accelerations, and when the user's hand 499 is holding the user device 405 near a top of the user device 402, inertial sensors 482 may detect second angular accelerations and linear accelerations. In one embodiment, if the inertial sensors 482 are near a top of the user device 402, then the first linear and angular accelerations may have greater magnitudes than the second linear and angular accelerations.

In one embodiment, when the presence of a human body part is detected, user device 405 uses motion data from the inertial sensors 482 to determine whether the human body part is near the bottom 406 of the user device or near the top 402 of the user device. In this regard, the inertial sensors 482 may be used to detect a hand grip type employed by the user of the user device 405.

Figure 4F:
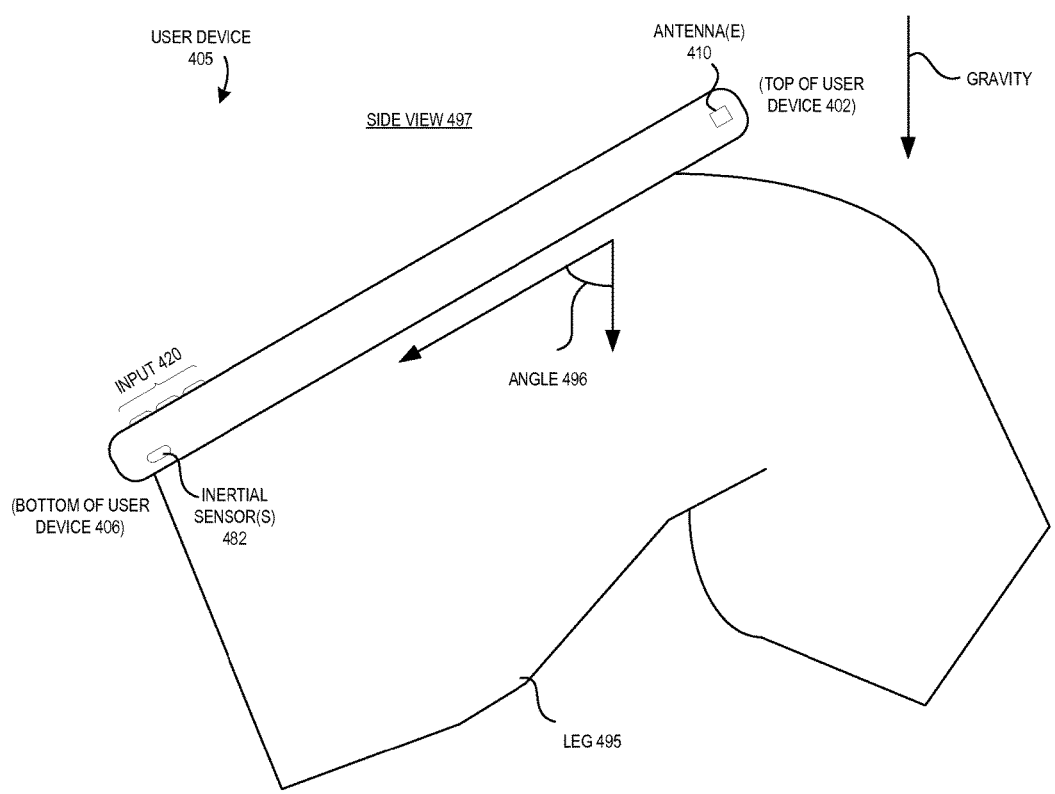
FIG. 4F illustrates a side view of a user device, wherein the user device is resting against a leg of a user, according to embodiments of the present disclosure.

FIG. 4F illustrates a side view 497 of the user device 405, wherein the user device 405 is resting against a leg 495 of a user, in accordance with one embodiment of the present invention. The user's leg 495 may be relatively motionless. Accordingly, the inertial sensors 482 may not detect motion of the user device 405 sufficient to identify the presence of a human body part when the user device 405 is resting against a user's leg 495. However, it has been observed that the user device 405, when tilted at particular angles (e.g., angle 496), has a high probability of being held by a user.

Accordingly, in one embodiment the inertial sensors 482 are used to determine an angle 496 of the user device 405 with respect to gravity. Gravity exerts a downward force that is measured by the inertial sensors 482 as an acceleration. When the user device 405 is relatively motionless, the acceleration caused by gravity may be identified, and the angle 496 of the user device 405 with respect to gravity may be determined. In one embodiment, if the angle with respect to gravity has a value that is less than a threshold angle (e.g., 80 degrees), the presence of a human body part is detected. Alternatively, the angle may be defined as an angle relative to horizontal (a plane normal to gravity), and the presence of a human body part may be detected when the angle with respect to horizontal is greater than a threshold value (e.g., greater than 10 degrees). Thus, the presence of a human body part may be detected using the inertial sensors 482 even when the user device 405 is motionless.

Figure 5A:
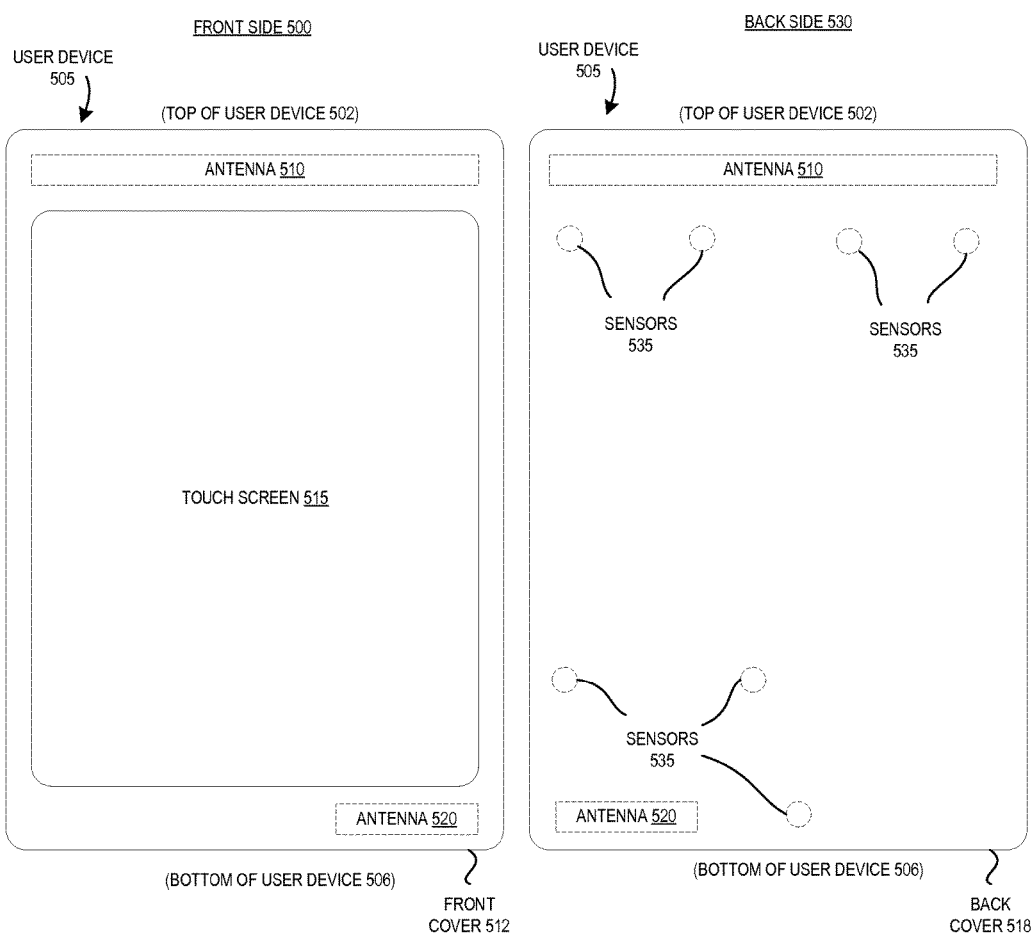
FIG. 5A illustrates an embodiment in which a user device includes multiple antennae, according to embodiments of the present disclosure.
Figure 5B:
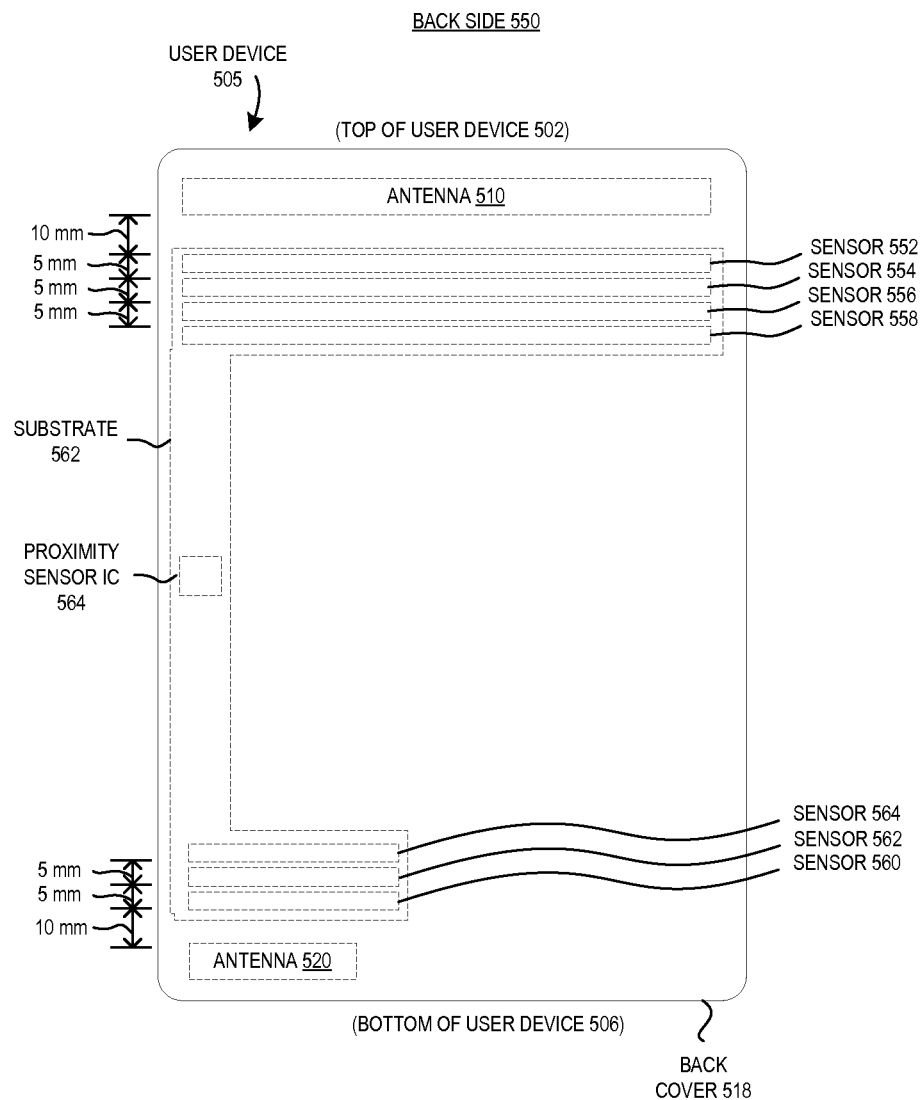
FIG. 5B illustrates a back side of a user device, according to embodiments of the present disclosure.
Figure 5C:
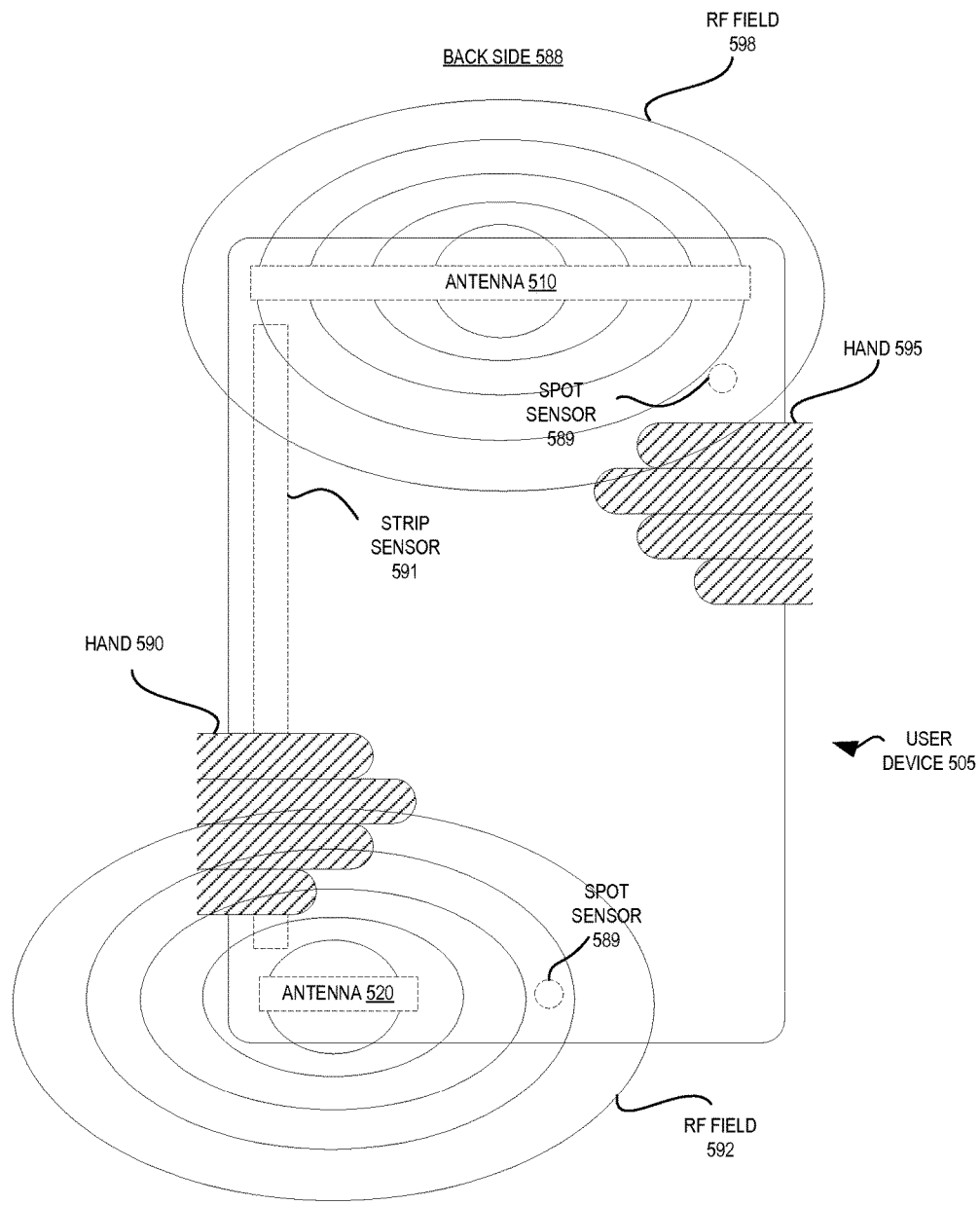
FIG. 5C illustrates a back side of a user device having two antennae in contact with portions of a human body, according to embodiments of the present disclosure.

FIGS. 5A-5C illustrate embodiments in which a user device 505 includes multiple antennas (e.g., antennae 106 of FIG. 1) configured for tuning in accordance with optimized tuner codes. In FIG. 5A, views of a front side 500 and back side 530 of the user device 505 show an antenna 510 positioned near a top 502 of the user device 505 and an antenna 520 positioned near a bottom 506 of the user device 505. The antennas 510, 520 are positioned at opposite ends of the user device 505 to minimize interference between signals generated by the antennas 510, 520. However, the antennas 510, 520 may also be positioned closer together. For example, antenna 510 may be positioned near the top 502 of the user device 505 as shown, and antenna 520 may be positioned at a side of the user device 505. In one embodiment, the antennas 510, 520 are positioned less than approximately 15 cm apart, which is the distance at which interference is typically introduced between antennas in user devices such as mobile phones. Such minimal separation between the antennas can be achieved without interference problems in one embodiment of the present invention due to a fine grained control of transmit power levels provided by the transmit power manager 135. According to implementations of the present disclosure, other methodologies may be employed to achieve minimal separation between the antennas, such as by providing a proper grounding technique, using different antenna configurations, etc.

When multiple antennas 510, 520 are used, sensors 535 may be positioned proximate to each antenna 510, 520. Alternatively, or in addition, one or both of antenna 510 and antenna 520 may function as proximity sensors. When a human body part is detected near an antenna, the transmit power level for that antenna may be throttled. Alternatively, the transmit power levels for both antennas may be throttled when any sensor 535 detects the presence of a human body part.

FIG. 5B illustrates a back side 550 of the user device 505, in accordance with one embodiment of the present invention. The back side 550 of the user device 505 shows an antenna 510 positioned near a top 502 of the user device 505 and an antenna 520 positioned near a bottom 506 of the user device 505. Multiple sensors 552-558 are positioned proximate to antenna 510, and multiple sensors 560-564 are positioned proximate to antenna 520. In one embodiment, each of sensors 552-558 is disposed at a predetermined distance from antenna 510. For example, as shown sensor 552 is located 10 mm from antenna 510, sensor 554 is located 15 mm from antenna 510, sensor 556 is located 20 mm from antenna 510 and sensor 558 is located 25 mm from antenna 510. Depending on which of sensors 552-558 detect the presence of a human body part and/or relative strengths of detection signals generated by the sensors 552-558, a distance between the human body part and antenna 510 may be determined. For example, if sensor 556 detects the presence of a human body part, the user device may determine that the human body part is 20 mm from antenna 510. Similarly, each of sensors 560-564 may be disposed at a predetermined distance from antenna 520. For example, sensor 560 is 10 mm from antenna 520, sensor 562 is located 15 mm from antenna 520 and sensor 564 is located 20 mm from antenna 520. Depending on which of sensors 560-564 detect the presence of a human body part, a distance between the human body part and antenna 520 may be determined.

In one embodiment, each of sensors 552-564 is a sensor electrode that is mounted on a substrate 562, which may be a flexible substrate (e.g., polyimide, polyester, polyether ether ketone, etc.) or rigid substrate (e.g., a printed circuit board). Substrate 562 may have mounted thereon a proximity sensor integrated circuit 564 that may be electrically connected to each of the sensor electrodes (e.g., sensors 552-564).

FIG. 5C illustrates a back side 588 of a user device 505 having two antennas 510, 520 that is in contact with portions of a human body, in accordance with one embodiment of the present invention. Specifically, a user's left hand 595 and right hand 590 are shown to be in contact with the back side 588 of the user device 505. During transmission of data, each antenna 510, 520 emits a radio frequency (RF) field 598, 592 that may be absorbed by the portions of the human body (e.g., by the hands 590, 595). The illustrated right hand 590 would only potentially absorb an elevated amount of radiation from RF field 592, while left hand 595 would possibly absorb an elevated amount of radiation from RF field 598.

In one embodiment, the user device 505 includes multiple sensors for detecting the presence of human body parts (or potentially other objects). In one embodiment, the sensors include one or more spot sensors 589 and one or more strip sensors 591. Spot sensors 589 may have small sensing elements with a limited sensing range, while strip sensors 591 may have a large sensing element or elements that are able to detect the proximity of a human body part across a large area. For example, the illustrated strip sensor 591 can detect the presence of a human body part anywhere along a back right side of the user device 505. In one embodiment, in which the strip sensor 591 is a linear array of sensors or a slider sensor, the strip sensor 591 is capable of identifying where the hand 590 is positioned along the strip (e.g., nearer antenna 510 or antenna 520).

Upon detection of the hand 595 near antenna 510, the user device 505 may throttle an output power level used to transmit data via the antenna 510. Upon detection of the hand 590 near antenna 520, the user device 505 may throttle an output power level used to transmit data via the antenna 520. Alternatively, the user device 505 may throttle an output power of both antenna 510 and 520 upon detecting the presence of any human body part, whether it is detected closer to antenna 510 or antenna 520.

Figure 6:
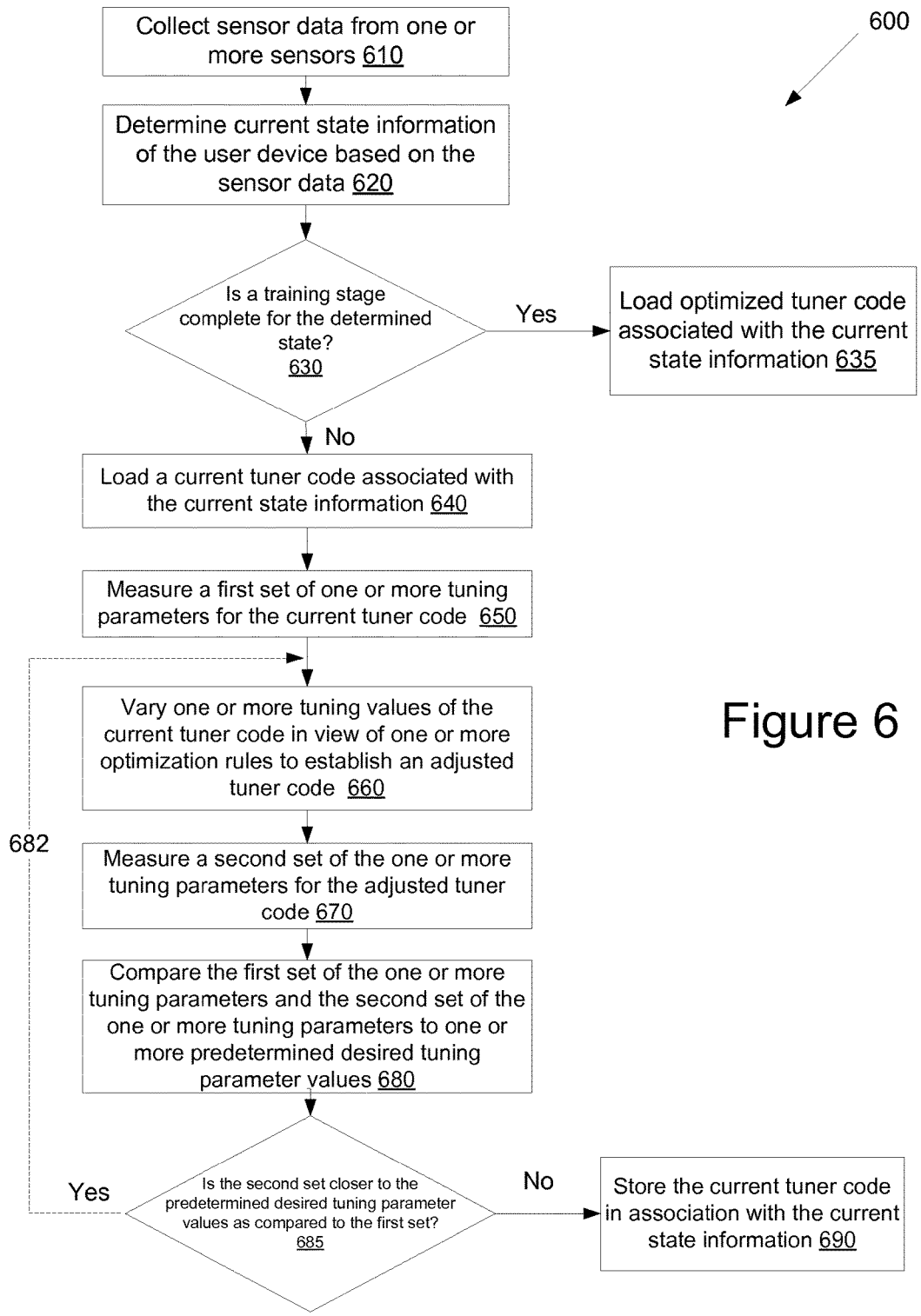
FIG. 6 is a flow diagram of an embodiment of a method for determining an optimized antenna tuner code, according to embodiments of the present disclosure.

FIG. 6 is a flow diagram of one embodiment of a method for dynamically determining an optimized tuner code for operation of one or more antennae of a user device. At block 610 of method 600, sensor data is received and collected from one or more sensors of the user device. In an embodiment, the sensor data may be collected on an on-going basis as part of a process running in a background of the standard operation of the user device. In an embodiment, the collection of the sensor data may be initiated by a state identification process (e.g., a factory reset of the user device, an initial setup and configuration of a new user device, after the passage of a predefined time interval since a last state identification process, etc.).

At block 620, current state information of the user device is determined based on the collected sensor data. The current state information may represent any number of state values, such as state values reflecting individual, behavioral, and environmental characteristics associated with a user, the user device, and an operating environment of the user device. In an embodiment, the individual characteristics may include data associated with an individual user's characteristics, such as, for example, a user's body stature, a user's body properties, a size of a user's hands, dielectric parameters, loss tangent parameters, etc. In an embodiment, the behavioral characteristics may include data associated with a user's behavior as it relates to usage of the user device, such as, for example, a hand grip type (e.g., a right-handed or left-handed grip), a tilt of the user's head, a tendency to grip the user device in a right-handed manner or a left-handed manner (i.e. a grip tendency), etc. In an embodiment, the environmental characteristics may include data associated with the environment of the user device, such as, for example, use of the user device with one or more accessories (e.g., a case, payment accessories, headphones, etc.), temperature or climate-related factors, one or more cell towers frequently or commonly accessed by the user device, a most recently accessed network, a preferred network used by the user device (e.g., a home Wifi network), one or more Wifi channels used by the user device, etc.

In block 630, a determination is made whether a training stage is complete for the determined current state information. In an implementation, the training stage may be considered complete for the determined state information if a predetermined quantity of samples for the state information has been collected, if a predetermined quantity of previous training iterations (e.g., blocks 660-690) has been performed with respect to the current state information, etc. In block 635, if the training stage is complete for the current state information, a tuner code associated with the determined state is deemed optimized and loaded for use in operating one or more antennae of the user device.

If the training stage is not complete for the user device state, one or more tuning values of a current tuner code associated with the current state information are loaded, in block 640. In an embodiment, the user device may have an antenna tuning table populated with various state information associated with respective initial or pre-set tuner codes. In an embodiment, the user device may be preset at the factory to include a tuner code table with the state information and tuner code associations. In an implementation, the tuner codes are each associated with one or more tuning values. In an embodiment, the one or more tuning values associated with a tuner code may include any register value of the tuner code that has an impact on inductance or capacitance of the antenna tuner. An exemplary tuner code table is illustrated in FIG. 7.

In an implementation, the one or more tuning values associated with the current tuner code are provided to an antenna tuner for use in tuning one or more antennae. In block 650, one or more tuning parameters for the current tuner code of the user device are measured (i.e., a first set of one or more tuning parameter measurements). Exemplary tuning parameters that may be measure include an RSSI value, a transmission level value, a return loss value, an antenna input impedance value, etc.

In block 660, the one or more tuning values of the current tuner code are varied in accordance with one or more optimization rules to establish a modified tuner code (i.e., a tuner code having the varied or adjusted tuning values). In an embodiment, the optimization rules may include rules defining predetermined no-go or invalid values for the tuning values (i.e., certain values to be avoided when varying the tuning values), the establishment of preset variation levels wherein the current tuning value is increased or decreased by a fixed amount or in accordance with an optimization model, the establishment of a variation range wherein the tuning values may be varied within a predetermined range of acceptable values, etc. For example, a first tuning value (e.g., a register value) associated with a current tuner code (e.g., tuner code A4) may be incremented from a current value to a new or adjusted value. In another example, the tuning values of a tuner code may be varied to adjusted values that do not equal one or more pre-determined no-go or invalid values.

In an embodiment, during the varying of the tuning values, the antenna tuner optimization engine may confirm that the new or modified tuning values are not set to the predetermined no-go or invalid values. In an implementation, the optimization rules may indicate that the one or more tuning values be varied in a random fashion or in accordance with a suitable optimization algorithm. In an embodiment, the one or more optimization rules may define a predetermined range of values that may be established for a respective tuning value, such that the tuning value is varied only within the preset range. In an embodiment, the one or more optimization rules may establish preset variation levels or amounts, wherein the current tuning value is increased or decreased by the preset variation amount. In an implementation, the one or more tuning values may be varied to establish an inductance or capacitance within a predetermined range of acceptable or desired inductance or capacitance values.

In an implementation, the one or more tuning values associated with the modified tuner code are provided to the antenna tuner for use in tuning the one or more antennae. In block 670, the one or more tuning parameters are measured for the modified tuner code. In block 680, the first set of the measured one or more tuning parameters (i.e., the parameter(s) measured for the initial or current tuner code in block 660) are compared to the second set of the measured one or more tuning parameters (i.e., the parameter(s) measured for the modified tuner code).

In block 685, a determination is made whether the one or more tuning parameters improved based on a comparison of the measurements of the first set of tuning parameters (measured for the initial/current tuner code) to the second set of tuning parameters (measured for the modified tuner code). In an implementation, the comparison may indicate an improvement in the tuning parameters if the second set of tuning parameters are closer in value to one or more predetermined desired tuning parameter values than the first set of tuning parameters. In an implementation, the comparison may indicate a lack of improvement in the tuning parameters if the first set of tuning parameters are closer in value to the predetermined desired tuning parameter value than the second set of tuning parameters. In an implementation, a predetermined desired tuning parameter value (or range of values) may be maintained for each of the multiple tuning parameters (e.g., a RSSI value, a transmission level value, a return loss value, an antenna input impedance value, etc.)

If, in block 685, the one or more tuning parameters do not show improvement (i.e., the comparison indicates that the tuning parameter performs better for the initial or current tuner code as compared to the modified tuner code), then the training stage is deemed complete and the current or initial tuner code (i.e., the tuner code loaded in block 640) is stored as the optimized tuner code in association with the determined state information, in block 690.

Alternatively, in block 685, if it is determined that the tuning parameter has shown improvement (i.e., the comparison indicates that the tuning parameter for the modified tuner code is closer to the predetermined desired tuning parameter value as compared to the tuning parameter measured for the initial or current tuner code), then the process returns to block 660 for continuance of the training stage (as indicated by dashed line 682 in FIG. 6). It is noted that during subsequent iterations of the training stage, the "current" tuner code is replaced by the modified tuner code from the previous iteration. For example, during a second iteration of block 660, the one or more tuning values of the new current tuner code (i.e., the modified tuner code of the first iteration) are varied to identify a new modified tuner code.

Upon a determination in block 685 during any subsequent iteration that the current tuner code performs better than a modified tuner code (i.e., the tuning parameters for the current tuner code are closer to the predetermined desired tuning parameter value than the tuning parameters for the modified tuner code), the current tuner code is considered the optimized tuner code and stored in association with the current state information, in block 690.

As shown in FIG. 6, this process may be performed iteratively over a period of time (in blocks 660-690) until the training stage is complete. In an implementation, a training stage may be deemed complete when a predetermined or threshold quantity of samples for the current state information has been identified, when the tuning parameters no longer improve for the modified tuner code as compared to the tuning parameter performance for the current tuner code, when the improvement of tuning parameters for the modified tuner code is considered negligible as compared to the tuning parameter performance for the current tuner code (i.e., when a difference between the first set of tuning parameter values and the second set of tuning parameter values is within a predetermined range of values indicating the change is negligible).

According to implementations of the present disclosure, execution of method 600 over time may result in the "learning" of the various individual, behavioral, and environmental characteristics associated with a user device. The learned characteristics affecting antenna tuning enables the generation of a unique profile associated with the user and the user device. Advantageously, the factory-established tuner codes may be updated and optimized in view of the learning process executed in accordance with the present disclosure, resulting in a better and customized tuning of the one or more antennae of the user device.

In block 695, upon completion of the training phase, the tuner code associated with the optimized tuning parameter measurement is established as the "optimized tuner code" and stored in association with the current state information of the user device. In an implementation, the optimized tuner code is loaded into the antenna tuner code table and used to tune one or more antennae of the user device.

FIG. 7 illustrates an exemplary tuner code lookup table in accordance with embodiments of the present disclosure. As shown in FIG. 7, state information may be characterized by a number of different state values (e.g., a use mode state, a frequency state, an image state, a capacitive state, an accelerometer state, a time, a pressure state, a temperature. Each set of state information (e.g., collection of state values that may be identified as the current state information of a user device based on the sensor data) is associated with a tuner code (e.g., tuner codes A2, BF, A9, B7, BC in FIG. 7). As described above, the table may initially be loaded with factory settings which associate preset tuner codes with certain state information. In accordance with the present disclosure, the tuner codes maintained in the table, and their corresponding operating values, may be varied and optimized during a training stage.

In an embodiment, the exemplary lookup table shown in FIG. 7 may be updated and optimized over time and in view of the individual, behavioral, environmental characteristics associated with the user device.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "obtaining", "performing", "determining", "measuring", "optimizing", "operating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Some portions of the detailed description are presented in terms of methods. These methods may be performed by processing logic that may comprise hardware (circuitry, dedicated logic, etc.), software (such as is run on a general purpose computer system or a dedicated machine), or a combination of both. In certain embodiments, the methods are performed by a user device, such as user device 102 of FIG. 1, or a remote computing device (e.g., server 120 of FIG. 1). Some methods may be performed by an antenna tuner optimization engine (e.g., tuner optimization engine 104) operating on a user device (e.g., user device 102 of FIG. 1) or on a server (e.g., server 120 of FIG. 1).

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   obtaining, by a user device, sensor data from one or more sensors of the user device;
   determining current state information of the user device determined from the sensor data, wherein the current state information comprises at least one individual characteristic comprising data defining a size of a hand of a user of the user device, at least one behavioral characteristic comprising a hand grip type being used to hold the user device, and at least one environmental characteristic comprising a use of an accessory with the user device;
   identifying a first tuning value for a first tuner code associated with the current state information, wherein the first tuning value comprises a register value setting an inductance or a capacitance associated with the first tuner code, and wherein the first tuner code is identified via a look-up of a tuner code table stored on the user device;
   providing the first tuning value for the first tuner code to an antenna tuner;
   measuring a first set of tuning parameters for the first tuner code, wherein the first set of tuning parameters comprises at least one of a received signal strength indication (RSSI) parameter, a transmission level parameter, a reception level parameter, a return loss parameter, or an antenna input impedance parameter;
   varying the first tuning value for the first tuner code to determine a second tuner code comprising a second tuning value;
   providing the second tuning value for the second tuner code to the antenna tuner;
   measuring a second set of tuning parameters for the second tuner code;
   determining that the second set of tuning parameters is closer in value to one or more predetermined desired tuning parameter values than the first set of tuning parameters;
   varying the second tuning value for the second tuner code to determine a third tuner code comprising a third tuning value;
   providing the third tuning value for the third tuner code to the antenna tuner;
   measuring a third set of tuning parameters for the third tuner code;
   determining that the second set of tuning parameters are closer in value to the one or more predetermined desired tuning parameter values than the third set of tuning parameters;
   storing the second tuner code in association with the current state information; and
   tuning one or more antennae according to the second tuner code.

2. The method of claim 1, wherein the at least one individual characteristic further comprises at least one of a dielectric parameter associated with the user or a loss tangent parameter associated with the user, and wherein the at least one behavioral characteristic further comprises at least one of a tilt position of the user's head, or a hand grip tendency of the user, and wherein the at least one environmental characteristic comprises at least one of a temperature factor, information about one or more cell towers previously accessed by the user device, or information about one or more wireless channels used by the user device.

3. The method of claim 1, wherein determining the current state information of the user device determined from the sensor data is performed in response to occurrence of a state identification process, the state identification process comprising one of a reset of the user device or a powering on of the user device.

4. A user device comprising:
   one or more sensors; and
   a processing device operatively coupled to the one or more sensors, the processing device to:
      receive sensor data from the one or more sensors;
      determine, based on the sensor data, current state information associated with the user device, the current state information comprising:
         a first characteristic comprising at least one of a tilt angle associated with a head of a user of the user device, a tilt position associated with the head of the user, or a tendency of the user to grip the user device in a right-handed manner or a left-handed manner;
         a second characteristic comprising at least one of a use of an accessory with the user device, an identification of a cell tower accessed by the user device, or information associated with a wireless channel used by the user device; and
         a third characteristic comprising at least one of a size of a hand of the user, a dielectric parameter associated with the user, or a loss tangent associated with the user;
      tune one or more antennae of the user device using a first tuner code comprising a first set of tuner values;
      measure a first set of tuning parameters for the first tuner code;
      vary one or more tuner values of the first set of tuner values of the first tuner code to identify a modified tuner code;
      measure a second set of tuning parameters for the modified tuner code;
      determine that the second set of tuning parameters are closer in value to one or more predetermined desired tuning parameter values than the first set of tuning parameters;
      tune one or more antennae according to the modified tuner code; and
      store the modified tuner code in a tuner code table of the user device in association with the current state information.

5. The user device of claim 4, wherein the first set of tuning parameters comprises at least one of a received signal strength indicator value, a transmission level value, a return loss value, or an antenna input impedance value.

6. The user device of claim 4, wherein the one or more tuning values comprise one or more values for at least one of the inductance or the capacitance associated with the first tuner code.

7. The user device of claim 4, wherein the one or more tuner values of the first tuner code are varied within a range of predetermined acceptable tuning values.

8. A method comprising:
   determining, by a processing device, a first set of state information of a user device based on sensor data collected by one or more sensors of the user device, the first set of state information comprising:
      a first characteristic comprising at least one of a tilt angle associated with a head of a user of the user device, a tilt position associated with the head of the user, or a tendency of the user to grip the user device in a right-handed manner or a left-handed manner;

a second characteristic comprising at least one of a use of an accessory with the user device, an identification of a cell tower accessed by the user device, or information associated with a wireless channel used by the user device; and a third characteristic comprising at least one of a size of a hand of the user, a dielectric parameter associated with the user, or a loss tangent associated with the user;

tuning, by the processing device, one or more antennae of the user device using a first tuner code comprising a first set of tuner values;

measuring, by the processing device, a first set of tuning parameters for the first tuner code;

varying, by the processing device, one or more tuner values of the first tuner code to identify a modified tuner code;

measuring, by the processing device, a second set of tuning parameters for the modified tuner code;

determining, by the processing device, that the second set of tuning parameters are closer in value to one or more predetermined desired tuning parameter values than the first set of tuning parameters;

tuning, by the processing device, one or more antennae according to the modified tuner code;

storing the modified tuner code in a tuner code table of the user device in association with the current state information;

determining a second set of state information of the user device based on sensor data collected by the one or more sensors of the user device;

determining the second set of state information matches the first set of state information;

identifying the modified tuner code in the tuner code table; and tuning the one or more antennae according to the modified tuner code.

9. The method of claim 8, wherein the first set of state information of the user device is determined in response to an occurrence of a state identification process.

10. The method of claim 9, wherein the state identification process comprises at least one of a factory reset of the user device or a setup process associated with the user device.

11. The method of claim 8, wherein the one or more tuner values comprise one or more values for at least one of the inductance or the capacitance associated with the first tuner code.

12. The method of claim 8, wherein the first set of tuning parameters comprises at least one of a received signal strength indicator value, a transmission level value, a return loss value, or an antenna input impedance value.

* * * * *